United States Patent
Kirubaharan et al.

(10) Patent No.: US 9,352,668 B2
(45) Date of Patent: May 31, 2016

(54) VEHICLE SEAT WITH A MEMORY DEVICE

(75) Inventors: Albert Reginold Kirubaharan, Burscheid (DE); Helmut Mai, Düsseldorf (DE)

(73) Assignee: JOHNSON CONTROLS GMBH, Burscheid (DE)

( * ) Notice: Subject to any disclaimer, the term of this patent is extended or adjusted under 35 U.S.C. 154(b) by 217 days.

(21) Appl. No.: 13/819,691

(22) PCT Filed: Sep. 2, 2011

(86) PCT No.: PCT/EP2011/004427
§ 371 (c)(1),
(2), (4) Date: Apr. 17, 2013

(87) PCT Pub. No.: WO2012/028327
PCT Pub. Date: Mar. 8, 2012

(65) Prior Publication Data
US 2014/0145484 A1    May 29, 2014

(30) Foreign Application Priority Data

Sep. 3, 2010 (DE) .......... 10 2010 044 340
Sep. 20, 2010 (DE) .......... 10 2010 045 738

(51) Int. Cl.
*B60N 2/235* (2006.01)

(52) U.S. Cl.
CPC .................... *B60N 2/2358* (2013.01)

(58) Field of Classification Search
USPC ........... 297/378.1, 378.14, 367 R, 367 L, 363
See application file for complete search history.

(56) References Cited

U.S. PATENT DOCUMENTS

| | | | | | |
|---|---|---|---|---|---|
| 4,708,392 | A | * | 11/1987 | Werner et al. | 297/362 |
| 4,832,405 | A | * | 5/1989 | Werner et al. | 297/362 |
| 4,916,962 | A | * | 4/1990 | Tsutsumi et al. | 74/392 |
| 4,930,841 | A | * | 6/1990 | Wittig | 297/378.12 |
| 5,052,989 | A | * | 10/1991 | Reubeuze | 475/170 |
| 5,216,936 | A | * | 6/1993 | Baloche | 74/527 |
| 5,364,165 | A | * | 11/1994 | Okamoto | 297/364 |

(Continued)

FOREIGN PATENT DOCUMENTS

| | | | |
|---|---|---|---|
| DE | 3816833 | A1 | 11/1989 |
| DE | 102007005893 | A1 | 8/2008 |

(Continued)

OTHER PUBLICATIONS

International Search Report for International Application No. PCT/EP2011/004427 and English translation, date of mailing Mar. 22, 2012, 6 pages.

(Continued)

*Primary Examiner* — David R Dunn
*Assistant Examiner* — Timothy J Brindley
(74) *Attorney, Agent, or Firm* — Foley & Lardner LLP

(57) ABSTRACT

A vehicle seat includes a seat component and a back rest which, in the position of use of the back rest, can be rotated relative to the seat component, out of the position of use and into an easy entry position, for comfort purposes and for simplified access to the rear seats. The back rest has a locking mechanism which locks the back rest in the desired position of use and which is provided with a device which interacts with the locking mechanism and locks the back rest automatically in the original desired position of use as it leaves the easy entry position.

4 Claims, 7 Drawing Sheets

(56) References Cited

U.S. PATENT DOCUMENTS

| | | | |
|---|---|---|---|
| 5,516,198 A * | 5/1996 | Yokoyama | 297/362 |
| 5,524,970 A * | 6/1996 | Kienke et al. | 297/362 |
| 6,007,153 A * | 12/1999 | Benoit et al. | 297/378.12 |
| 6,039,399 A * | 3/2000 | Whalen et al. | 297/362.12 |
| 6,092,874 A * | 7/2000 | Kojima et al. | 297/367 R |
| 6,543,849 B1 * | 4/2003 | Yamada | 297/363 |
| 6,758,524 B2 * | 7/2004 | Kisiel | 297/362 |
| 7,819,479 B2 * | 10/2010 | Halbig et al. | 297/378.14 |
| 8,109,574 B2 * | 2/2012 | Becker et al. | 297/378.14 |
| 8,491,054 B2 * | 7/2013 | Myers et al. | 297/378.12 |
| 8,517,470 B2 * | 8/2013 | Roth et al. | 297/362.12 |
| 8,657,377 B2 * | 2/2014 | Barzen et al. | 297/378.1 |
| 8,690,251 B2 * | 4/2014 | Miller et al. | 297/378.12 |
| 2006/0181131 A1 | 8/2006 | Kienke et al. | 297/367 |
| 2007/0040437 A1 * | 2/2007 | Nagura et al. | 297/367 |
| 2007/0096530 A1 * | 5/2007 | Ohba et al. | 297/367 |
| 2008/0315656 A1 * | 12/2008 | Becker et al. | 297/378.1 |
| 2010/0141007 A1 * | 6/2010 | Kienke et al. | 297/367 R |
| 2013/0057043 A1 * | 3/2013 | Ngiau et al. | 297/378.1 |

FOREIGN PATENT DOCUMENTS

| | | |
|---|---|---|
| EP | 1178898 B1 | 8/2004 |
| EP | 0867329 B1 | 10/2005 |

OTHER PUBLICATIONS

International Preliminary Report on Patentability in PCT/EP2011/004427 dated Mar. 5, 2013.

* cited by examiner

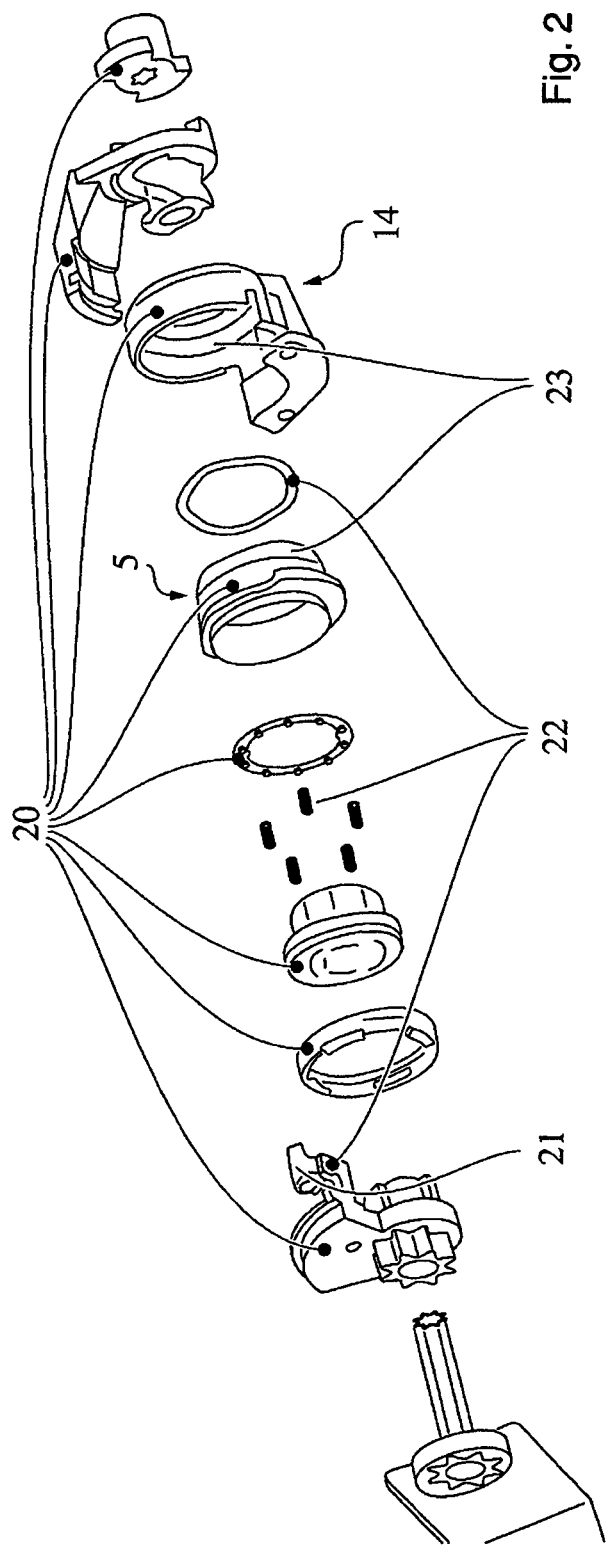

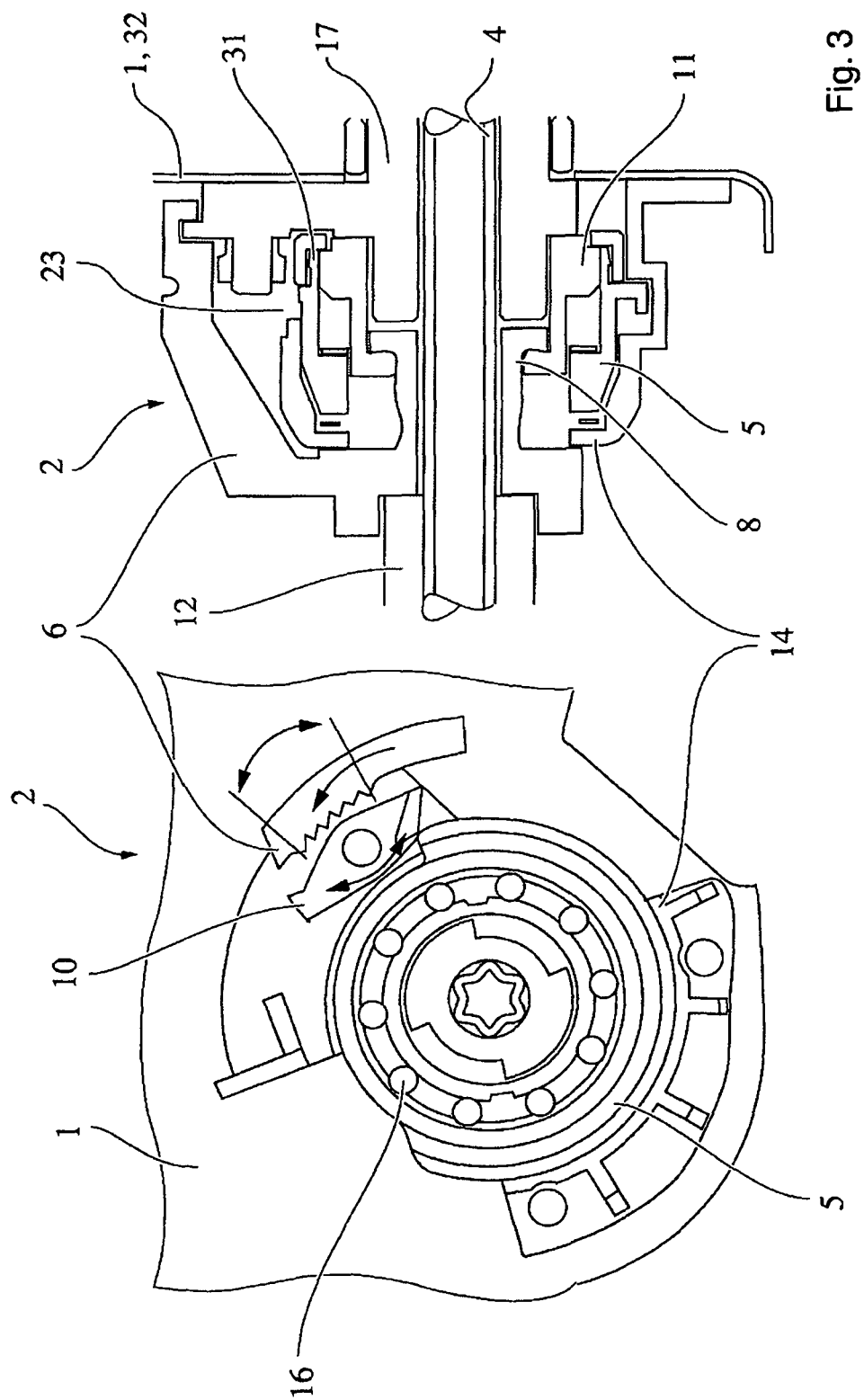

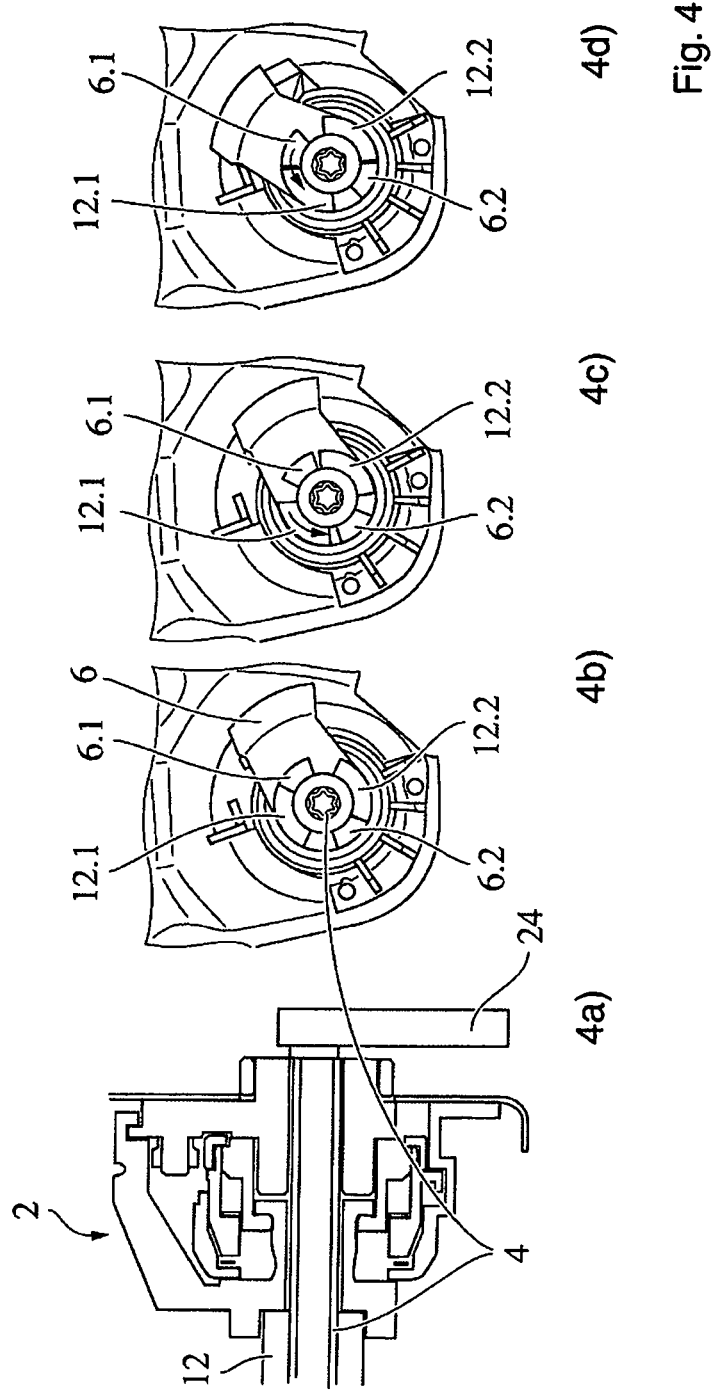

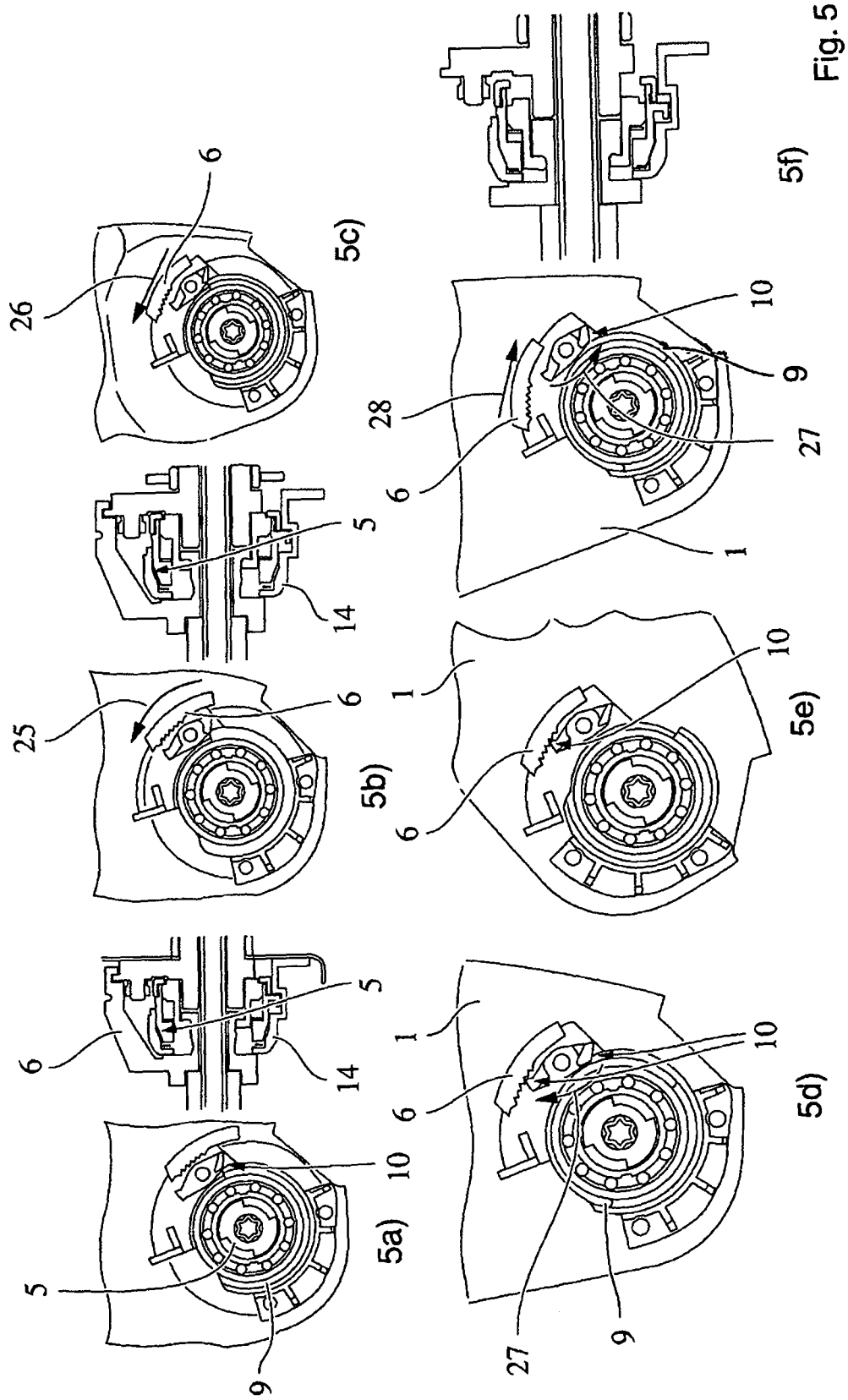

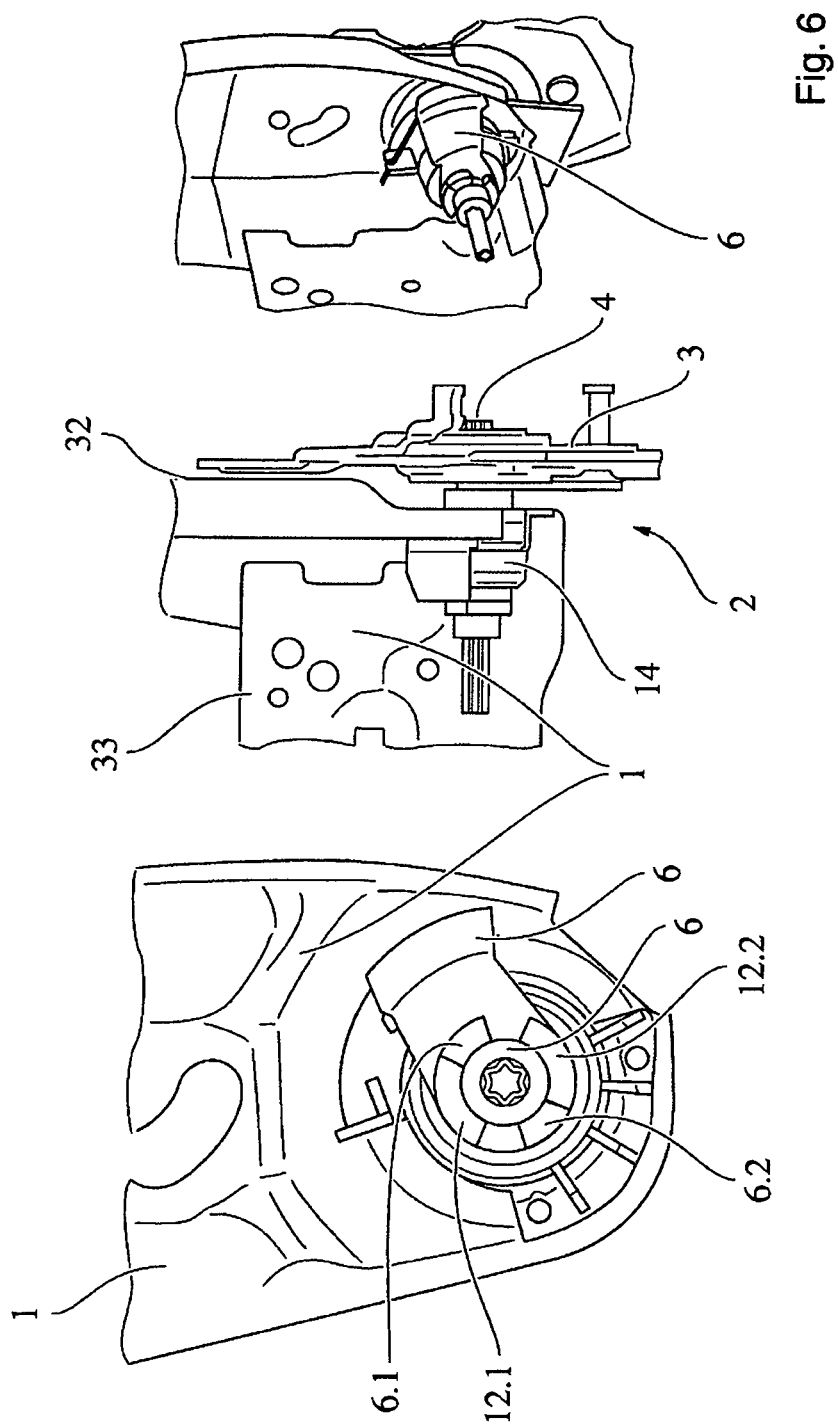

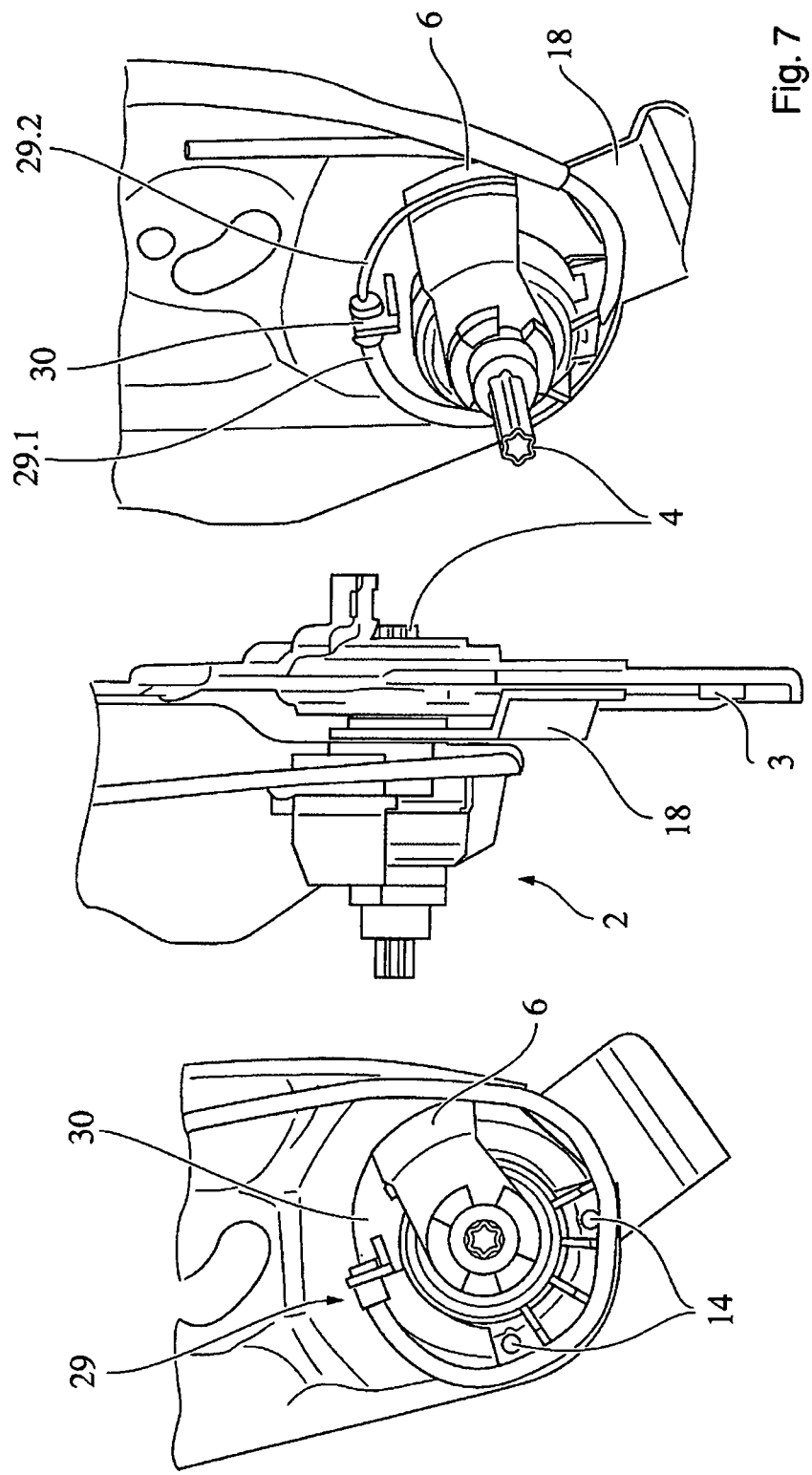

VEHICLE SEAT WITH A MEMORY DEVICE

CROSS REFERENCE TO RELATED APPLICATIONS

The present application is a National Stage of International Application No. PCT/EP2011/004427 filed on Sep. 2, 2011, which claims the benefit of German Patent Application No. 10 2010 044 340.9 filed on Sep. 3, 2010 and German Patent Application No. 10 2010 045 738.8 filed on Sep. 20, 2010, the entire disclosures of which are incorporated herein by reference.

The present invention relates to a vehicle seat with a seat part and a backrest which, in the use position of the backrest, can be rotated relative to the seat part, from the use position into an easy entry position, for comfort purposes and for simplified access to the rear seats, the backrest having a locking mechanism which locks the backrest in the desired use position, and the backrest being provided with a device which interacts with the locking mechanism and locks the backrest, coming from the easy entry position, automatically in the original, desired use position again.

A vehicle seat of this type is known, for example, from EP 0 867 329 B1. Another prior art is EP 1 178 898 B1. However, the vehicle seats described there are of comparatively complex design.

It was therefore the object of the present invention to provide a vehicle seat of the type in question which has a lower weight than the vehicle seats from the prior art, is of compact construction and in which the memory device can be provided within the two side parts of the backrest.

The object is achieved by a vehicle seat with a seat part and a backrest which, in the use position of the backrest, can be rotated relative to the seat part, from the use position into an easy entry position, for comfort purposes and for simplified access to the rear seats, the backrest having a locking mechanism which locks the backrest in the desired use position, and the backrest being provided with a device which interacts with the locking mechanism and locks the backrest, coming from the easy entry position, automatically in the original, desired use position, wherein the device and the locking mechanism are provided coaxially.

The present invention relates to a vehicle seat with a seat part and a backrest which, in the "use position", in which the backrest is arranged substantially vertically, can be adjusted relative to the seat part in such a manner that the backrest takes up an angle which is as comfortable as possible for the particular seat occupant's back. Furthermore, the backrest can be rotated from the use position into an "easy entry position", in which the backrest is rotated forward relative to the seat part to such an extent that the vehicle seats located behind the vehicle seat according to the invention are more easily accessible.

According to the invention, the vehicle seat has a locking mechanism which locks the backrest in the respectively desired use position. In order to ensure that the backrest, coming from the easy entry position, takes up said original, desired use position again, the vehicle seat according to the invention has a device which interacts with the locking system and locks the backrest to the seat part as soon as the backrest has taken up the original, desired angular position. Devices of this type are referred to by a person skilled in the art as memory devices.

According to the invention, provision is now made for the memory device and the locking mechanism to be provided coaxially, i.e. the memory device and the locking mechanism are preferably arranged in an axially offset manner along an axis or shaft. As a result, the vehicle seat according to the invention can be constructed very compactly, and it is possible to provide the memory device within the side parts of the vehicle seat.

The explanations made with regard to this subject matter according to the invention apply equally to the other subject matter according to the invention of the present invention, and vice versa.

According to a further subject matter according to the invention or preferred subject matter of the present invention, the device has a means which, on the adjustment of the backrest from the use position into the easy entry position, converts a rotational movement into a pure translational movement. By means of this transformation of the movement it is possible to design the vehicle seat according to the invention to be very compact and to be substantially realized using plastics parts.

The explanations made with regard to this subject matter according to the invention apply equally to all other subject matter according to the invention, and vice versa.

According to a further subject matter according to the invention or preferred subject matter of the present invention, the memory device has a linearly adjustable coupling.

The explanations made with regard to this subject matter of the present invention apply equally to the other subject matter of the present invention, and vice versa.

The explanations below apply equally to all subject matter according to the invention.

The memory device preferably has an unlocking means, for example an unlocking lever, which is driven, preferably rotated.

Said unlocking means preferably drives the coupling of the memory device.

Furthermore, preferably, the unlocking lever brings the coupling directly or indirectly into an interlocking, non-positive and/or frictional contact with the backrest, before adjustment of the latter into the easy entry position. As a result, the rotational movement of the backrest is transmitted to the coupling such that the latter likewise rotates.

A control element, for example a cam, which very particularly preferably controls a latching pawl, is preferably provided on the coupling. With such a latching pawl, the unlocking lever can preferably be locked in a desired position, in particular in the unlocking position thereof.

The unlocking lever preferably rotatively drives a transmission shaft which unlocks the locking mechanism for the easy entry adjustment of the backrest.

Furthermore, preferably, the vehicle seat according to the invention has a means, for example a lever, which unlocks the locking mechanism for the comfort adjustment of the backrest.

The invention is explained below with reference to FIGS. 1 to 7. Said explanations are merely by way of example and do not restrict the general inventive concept. The explanations apply equally to all the subject matter of the present invention.

FIG. 2 shows an exploded drawing of the memory device.

FIG. 3 shows the manner of operation of the memory device.

FIG. 4 shows the vehicle seat according to the invention during the adjustment into the easy entry position.

FIG. 5 shows the function of the memory device during the adjustment into the easy entry position.

FIG. 6 shows the vehicle seat according to the invention.

FIG. 7 shows the Bowden cable for adjusting the backrest into the easy entry position.

Figure 1:
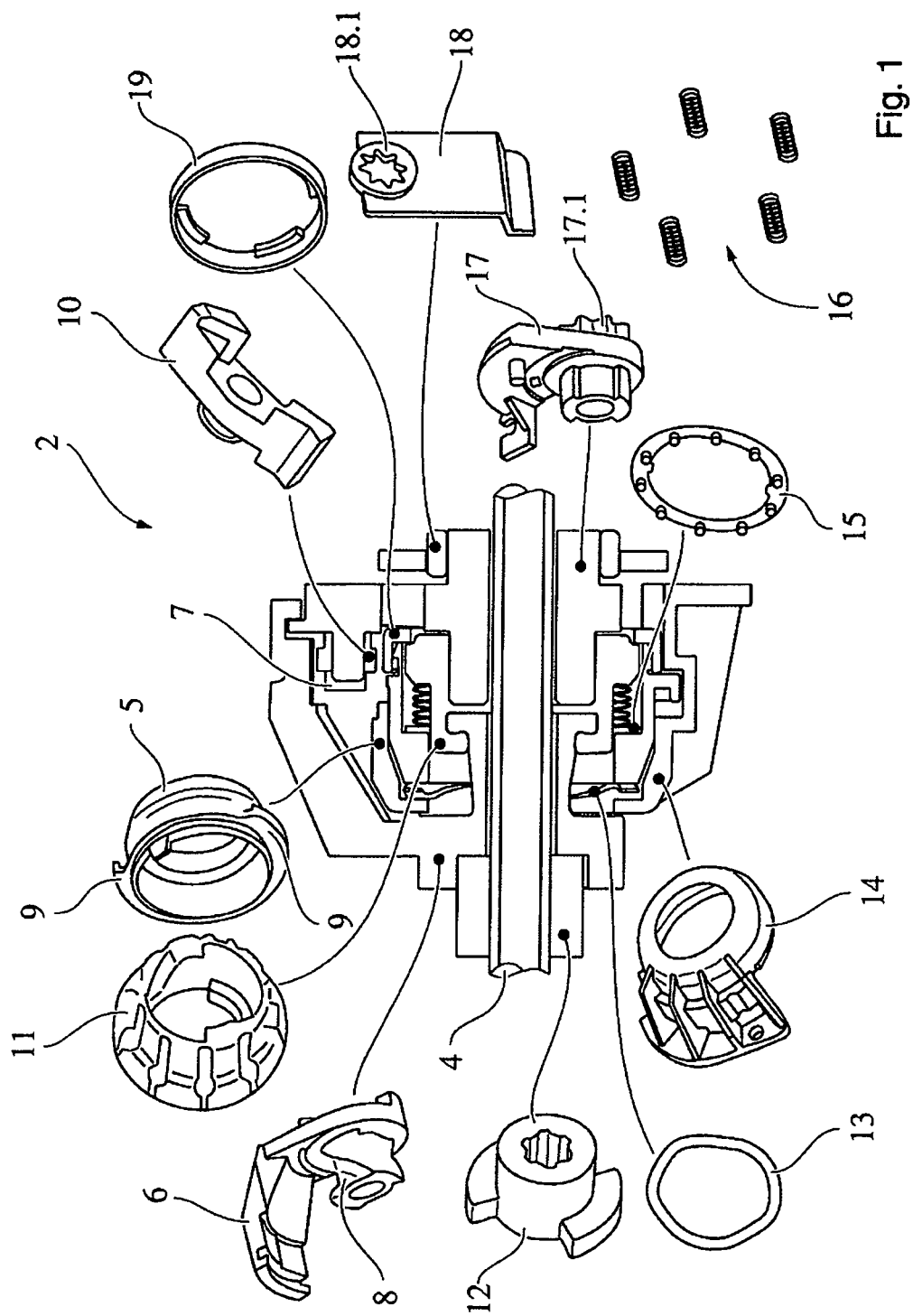
FIG. 1 shows the memory device.

FIG. 1 shows the memory device 2 which has an unlocking lever 6 which is provided so as to be rotatable about the transmission shaft 4, but is not connected to the latter in a manner secure against rotation. Said unlocking lever 6 is driven in a rotating manner, for example, by a Bowden cable, when the backrest is intended to be brought from the use position thereof into an easy entry position. In the section which extends around the transmission shaft 4, the unlocking lever 6 has a thread 8, in particular a very steep thread. The flanks of this thread interact with an actuating bushing 11 and displace the latter in a purely translatory manner, i.e. linearly. In the process, a coupling 5 is entrained, i.e. is also displaced purely axially, and is brought into non-positive, interlocking and/or frictional engagement with a housing 14, which is connected to the backrest for rotation therewith. A spring means 16, here a plurality of spiral springs, is provided between the actuating bushing 11 and the coupling 5, and a spring means, here a shaft ring 13, is provided between the housing 14 and the coupling 5. The shaft ring assists the movement of the coupling 5 away from the housing 14, i.e. when the backrest is rotated back again from the easy entry position into the use position. The spring means 16 serve primarily to compensate for tolerances. A control element 9, here a cam, is provided on the coupling 5, said cam, as can be seen in particular in FIG. 5, driving a pawl 10 which can interact in a locking manner with the unlocking lever 6. A spring means 7 is provided on the pawl 10 and prestresses the pawl in a direction of rotation, here in the clockwise direction. Furthermore, the memory device has a bushing 17 which is connected by means of the fastening means 18 to the seat part of the vehicle seat according to the invention for rotation therewith. Said bushing serves as an axial bearing and means of securing the actuating bushing 11 against rotation and also as a rotational bearing for the pawl 10. In order to ensure that the interlocking, non-positive and/or frictional connection between the housing 14 and the coupling 5 is released as soon as the unlocking lever 6 is no longer in the unlocking position thereof, the memory device has a driver 19 which is connected to the actuating bushing and ensures an essentially uniform rearward movement between the actuating bushing 11 and the coupling 5. Furthermore, the vehicle seat according to the invention has a transmission shaft 4 which is moved forward between the two side walls of the backrest. At one end thereof, the transmission shaft has, as illustrated in FIG. 4, an actuating lever 24, which, as soon as it is actuated, exerts a torque on the transmission shaft 4, as a result of which the locking mechanism is unlocked. A driving means 12 is provided for rotation with said transmission shaft 4, the driving means being driven by the unlocking lever 6 during an adjustment of the backrest from the use position into the easy entry position and thereby transmitting a torque to the transmission shaft 4, as a result of which the unlocking mechanism 3 is likewise unlocked. The sliding ring 15 serves substantially for the mounting of the spring means 16 and/or as a frictional surface with respect to the coupling 5. The memory device 2 is constructed very compactly and, for example, as illustrated in FIG. 2, can be substantially produced from plastics parts 20 because the forces and moments which occur are essentially very small because of the compact construction. As can likewise be gathered from FIG. 2, a frictional connection between the coupling 5 and the housing 14 is preferred. The surfaces 23 are therefore preferably provided with a high coefficient of friction.

FIG. 3 once again shows the manner of operation of the memory device 2. The latter is provided between the side walls of the backrest 1, i.e. a side wall 32 of the backrest 1 is located between the device 2 and the locking mechanism 3, which can be seen in particular in FIGS. 6 and 7. As long as the actuating lever 6 is not actuated, the transmission shaft 4 and therefore also the driving means 12 can rotate without the unlocking lever 6 or another part of the memory device rotating. The pawl 10 which, as illustrated by the double arrow in the left part of FIG. 3, is arranged rotatably about a bearing journal, is held by the radial cam 9 in a position in which said pawl is not in engagement with the unlocking lever 6. If, however, the unlocking lever 6 is rotated, as illustrated by the arrow on the left part in FIG. 3, the actuating bushing 11 is displaced axially, as illustrated by the double arrow 31, and in the process, entrains the coupling 5, this being illustrated by the double arrow provided in the coupling. As soon as the coupling is in form-fitting, non-positive and/or frictional connection with the housing 14, said coupling takes part in the rotational movement thereof and therefore in the movement of the backrest from the use position into the easy entry position, this likewise being illustrated by a further double arrow in the coupling 5. As soon as the backrest is rotated back from the easy entry position into the use position, the coupling 5 is pulled away again from the housing and the interlocking, non-positive and/or frictional connection between the two elements 5, 14 is released again.

FIGS. 4a-4c show the device 2 during the comfort adjustment of the backrest. In particular, it can be gathered from FIGS. 4b-4d that the unlocking lever 6 has two interlocking segments 6.1, 6.2 and the driving means 12 has two interlocking segments 12.1, 12.2. If the actuating lever 24 is then actuated, the transmission shaft 4 rotates, as a result of which the locking mechanism 3 (not illustrated) is unlocked. The seat occupant can then bring the freely rotating backrest, for example by pressing with his back or pulling with the hand or by means of a spring system, into a comfort position agreeable to him. During said rotational movement, as apparent in particular in FIG. 4c, the bearing surfaces of the segments 12.1, 12.2 do not enter into engagement with the segments 6.1, 6.2, i.e. torque is not transmitted to the unlocking lever 6 by the driving means 12. As soon as the comfort adjustment has taken place, the seat occupant releases the lever 24 and the locking mechanism locks again. Consequently, the memory device 2 remains unaffected on an unlocking triggered by the lever 24. If, by contrast, the backrest is brought from the use position thereof into the easy entry position, this being illustrated in FIG. 4d, the segments 6.1 and 6.2 enter into engagement with the segments 12.1, 12.2, as a result of which torque is transmitted by the unlocking lever 6 to the driving means 12 and rotationally drives the latter. Said rotational movement is transmitted in turn to the transmission shaft 4 which unlocks the locking mechanism 3. As a result, the locking mechanism is unlocked in order to adjust the backrest from the use position into the easy entry position.

FIG. 5 shows the memory device 2 during the rotation of the backrest from the use position into the easy entry position. In the illustration according to FIG. 5a, the coupling 5 is not yet in engagement with the housing 14. In the illustration according to FIG. 5b, the unlocking lever 6 has been rotated counterclockwise, as illustrated by the arrow 25, to an extent such that the coupling 5 is connected in a non-positive, interlocking and/or frictional connection to the housing 14. This makes it possible to detect the position of the backrest at the moment in which the backrest, coming from the easy entry position, is to be locked again. For this purpose the unlocking lever 6 has been rotated approximately through 10°. If, as illustrated in FIG. 5c, the unlocking lever 6 is rotated further counterclockwise, for example through 20°, the locking mechanism 3 (not illustrated) is unlocked. The backrest can then be rotated from the set use position thereof into the easy entry position. This is illustrated in FIG. 5d. As soon as the backrest is rotated through a small angular segment, for example 4°, in the clockwise direction here, the pawl 10 is disengaged from the control cam 9 and rotates, driven by a spring means 7 in the clockwise direction, as illustrated by the arrow 27. As a result, the left end of the pawl enters into interlocking and/or non-positive connection with the unlocking lever 6 and thereby prevents the latter from rotating back from the unlocking position thereof (illustrated here) into the locking position (cf. FIG. 5a). As a result, the locking mechanism 3 is kept in the unlocked position thereof and the backrest can rotate freely, as illustrated in FIG. 5e, and can be brought into the easy entry position thereof. If the backrest is rotated back from the easy entry position (FIG. 5e) into the use position, this being illustrated in FIG. 5f, the radial cam 9, on reaching the desired position of the backrest, enters into engagement again with the right part of the pawl 10 and rotates the latter, as again illustrated by the arrow 27, counterclockwise. As a result, the pawl 10 is disengaged from the unlocking lever 6 and the latter, as illustrated by the arrow 28, can rotate back into the locking position thereof, in the clockwise direction. The backrest is in exactly the same use position as originally, i.e. before the easy entry adjustment.

FIG. 6 shows the vehicle seat according to the invention, in particular the backrest thereof. Said backrest has the memory device 2 to the left of the side wall 32 and the locking mechanism 3 to the right of the side wall 32. It can clearly be seen that the memory device 2 and the locking mechanism 3 are provided coaxially along the transmission shaft 4. As a result of the fact that the device 2 is located within the side walls of the backrest and the recliner is located outside the side walls of the backrest, the vehicle seat according to the invention is very compact. The two side walls of the frame of the backrest are connected to each other by transverse connectors 33, wherein only the lower transverse connector is illustrated here.

FIG. 7 illustrates the triggering mechanism for bringing the backrest out of the use position into the easy entry position. This is undertaken by a Bowden cable 29, one end of which (not illustrated) is connected, for example, to a pressure switch. The sleeve 29.1 of the Bowden cable is attached to a holder 30 which is fixedly connected to the backrest. The core 29.2 is connected to the unlocking lever 6 and drives the latter in a rotating manner.

LIST OF REFERENCE NUMBERS

1 Backrest
2 Device, memory device
3 Locking mechanism
4 Transmission shaft
5 Coupling
6 Unlocking means, unlocking lever
6.1 First interlocking segment
6.2 Second interlocking segment
7 Spring means
8 Thread
9 Control element
10 Means, pawl
11 Means, actuating bushing
12 Driving means
12.1 First interlocking segment
12.2 Second interlocking segment
13 Spring means, shaft ring
14 Housing
15 Sliding ring
16 Spring means, spiral spring(s)
17 Bushing, bushing connected to the seat part
17.1 Interlocking means, teeth
18 Fastening means, provided on the seat part
18.1 Interlocking means, tooth-shaped recess
19 Driver
20 Plastics parts
21 Plastics or metal part
22 Spring means
23 Surface, with a preferably increased coefficient of friction
24 Actuating means, lever
25 Arrow
26 Arrow
27 Arrow
28 Arrow
29 Bowden cable
29.1 Sleeve
29.2 Core
30 Holder for the sleeve of the Bowden cable
31 Double arrow
32 Side wall of the backrest
33 Lower transverse connection between the two side walls of the backrest

The invention claimed is:

1. A vehicle seat comprising:
a seat part; and
a backrest which, in a use position of the backrest, can be rotated relative to the seat part, from the use position into an easy entry position, for comfort purposes and for simplified access to rear seats,
wherein the backrest has a locking mechanism which locks the backrest in the desired use position, and
wherein the backrest is provided with a device which interacts with the locking mechanism and locks the backrest, coming from the easy entry position, automatically in the original, desired use position,
wherein the device and the locking mechanism are provided coaxially,
wherein the device has an unlocking lever which is configured to be driven to an unlocking position to unlock the locking mechanism in order to adjust the backrest from the use position into the easy entry position,
wherein the device has a linearly adjustable coupling,
wherein the coupling has a control element,
wherein the control element controls a mechanism that interacts with the unlocking lever to keep the unlocking lever in the unlocking position thereof,
wherein the unlocking lever has a section that extends around a transmission shaft and has a thread in the section that extends around the transmission shaft,
wherein flanks of the thread are configured to interact with an actuating bushing to displace the actuating bushing in a purely linear manner,
wherein the unlocking lever rotatively drives the transmission shaft which unlocks the locking mechanism for the easy entry adjustment of the backrest.

2. The vehicle seat as claimed in claim 1, wherein the unlocking lever drives the coupling of the device linearly.

3. The vehicle seat as claimed in claim 2, wherein the unlocking lever brings the coupling directly or indirectly into an interlocking, non-positive and/or frictional contact with the backrest, before adjustment of the latter into the easy entry position.

4. The vehicle seat as claimed in claim 1, comprising an actuating mechanism which unlocks the locking mechanism for the comfort adjustment of the backrest.

* * * * *